(12) United States Patent
Kaneko et al.

(10) Patent No.: US 7,588,015 B2
(45) Date of Patent: Sep. 15, 2009

(54) DEVICE AND METHOD FOR CONTROLLING IGNITION TIMING OF INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Koji Aso, Susono (JP); Kenji Senda, Okazaki (JP); Yuichi Takemura, Anjo (JP); Shuhei Oe, Kariya (JP); Kiyoshi Iwade, Okazaki (JP)

(73) Assignees: Toyota Jidosha Kabushiki Kaisha, Toyota-shi (JP); Denso Corporation, Kariya-shi (JP); Nippon Soken, Inc, Nishio-shi (JP)

( * ) Notice: Subject to any disclaimer, the term of this patent is extended or adjusted under 35 U.S.C. 154(b) by 6 days.

(21) Appl. No.: 11/627,133

(22) Filed: Jan. 25, 2007

(65) Prior Publication Data
US 2007/0175444 A1 Aug. 2, 2007

(30) Foreign Application Priority Data
Jan. 27, 2006 (JP) .............................. 2006-019631

(51) Int. Cl.
*F02P 5/14* (2006.01)
*F02P 5/00* (2006.01)
(52) U.S. Cl. .............................. 123/406.21; 123/406.29
(58) Field of Classification Search ............ 123/406.34, 123/406.21, 406.29; 701/111; 73/35.06, 73/35.09
See application file for complete search history.

(56) References Cited

U.S. PATENT DOCUMENTS

| | | | | |
|---|---|---|---|---|
| 4,612,902 A | * | 9/1986 | Abe et al. ............... | 123/406.21 |
| 4,625,692 A | * | 12/1986 | Kashimura et al. ...... | 123/406.21 |
| 5,060,615 A | * | 10/1991 | Hashimoto et al. ...... | 123/406.16 |
| 5,119,783 A | * | 6/1992 | Komurasaki ............ | 123/406.29 |
| 6,736,109 B2 | * | 5/2004 | Hoshino ................. | 123/406.29 |
| 6,814,054 B2 | | 11/2004 | Sauler et al. | |
| 6,945,229 B1 | * | 9/2005 | Zhu et al. ............... | 123/406.21 |
| 7,040,285 B2 | * | 5/2006 | Kato et al. .............. | 123/406.37 |
| 2005/0234633 A1 | * | 10/2005 | Takemura et al. ........... | 701/111 |
| 2006/0136117 A1 | * | 6/2006 | Kaneko et al. ............... | 701/111 |

FOREIGN PATENT DOCUMENTS

| JP | 8-151950 | 6/1996 |
|---|---|---|
| JP | 8-218996 | 8/1996 |
| JP | 2003-21032 | 1/2003 |
| JP | 2004-508485 | 3/2004 |

OTHER PUBLICATIONS

JP 08-151950 (Daisuke Yamada) Jun. 11, 1996 (machine translation). [online] [retrieved on Jan. 3, 2009]. Retrieved from: JPO.*
JP 08-218996 (Shogo Imada) Jun. 11, 1996 (machine translation). [online] [retrieved on Jan. 3, 2009]. Retrieved from: JPO.*

* cited by examiner

*Primary Examiner*—Mahmoud Gimie
(74) *Attorney, Agent, or Firm*—Oblon, Spivak, McClelland, Maier & Neustadt, P.C.

(57) ABSTRACT

An engine ECU executes a program including a step of, when an absolute value of a difference between a determination value V(KX) used for determining presence or absence of knocking and a maximum value V(MAX) of magnitude value LOG(V), which is obtained by logarithmically converting a magnitude V detected based on a signal sent from a knock sensor, is greater than the product of a standard deviation σ and a coefficient U(3) in a frequency distribution of magnitude values LOG(V) for N cycle(s), setting a value obtained by adding the product of the standard deviation σ and the coefficient U(3) to the maximum value V(MAX) of the magnitude value LOG(V) as the determination value V(KX).

18 Claims, 15 Drawing Sheets

DEVICE AND METHOD FOR CONTROLLING IGNITION TIMING OF INTERNAL COMBUSTION ENGINE

This nonprovisional application is based on Japanese Patent Application No. 2006-019631 filed with the Japan Patent Office on Jan. 27, 2006, the entire contents of which are hereby incorporated by reference.

BACKGROUND OF THE INVENTION

1. Field of the Invention

The present invention relates to device and method for controlling ignition timing of an internal combustion engine, and particularly to a technique of controlling ignition timing based on whether knocking is present or absent.

2. Description of the Background Art

Conventionally, various methods of determining whether knocking (knock) is present or absent have been proposed. For example, there is a technique of determining occurrence of knocking based on whether or not magnitude of vibration detected in an internal combustion engine is greater than a knocking determination value. A knock control device for an internal combustion engine disclosed in Japanese Patent Laying-Open No. 2003-021032 includes: a knock sensor detecting knocking in an internal combustion engine; a statistical processing portion statistically processing an output signal detected by the knock sensor; a first temporal determination portion determining occurrence of knocking based on a processing result by the statistical processing portion; a second temporal determination portion determining occurrence of knocking based on a waveform shape of the output signal detected by the knock sensor; and a final determination portion finally determining occurrence of knocking based on the knock temporal determination of the first temporal determination portion and the knock temporal determination of the second temporal determination portion. When both of the first and second temporal determination portions determine that knocking has occurred, the final determination portion finally determines that knocking has occurred. In the first temporal determination portion, by comparing the maximum value of the output signals detected by the knock sensor with a knock determination level calculated based on the processing result by the statistical processing portion, whether or not knocking has occurred is determined. A knock determination value is corrected to a value obtained by subtracting a set value $\Delta V$ from the knock determination value or to a value obtained by adding the product of a value A greater than "1" and set value $\Delta V$ to the knock determination level, based on the occurrence frequency of knocking.

According to the knock control device disclosed by the publication, a knock temporal determination by a statistical processing program and a knock temporal determination by a waveform shape program are used, and only when both of the temporal determinations determine that knocking has occurred, it is finally determined that knocking has occurred. As a result, occurrence of knocking can precisely be determined even as to an output signal, which has been erroneously determined by a knock determination employing solely the statistical processing program or the waveform shape program.

However, even when whether knocking is present or absent is determined using a knock determination level (determination value) that is corrected according to the occurrence frequency of knocking as in the knock control device described in Japanese Patent Laying-Open No. 2003-021032, not always the presence or absence of knocking is precisely determined. For example, in starting the internal combustion engine, if an initial value of the determination value is greatly different from magnitude of vibration occurring in the internal combustion engine, whether knocking is present or absent may not be determined precisely until the determination value is corrected. During the period in which whether knocking is present or absent cannot be determined precisely, ignition timing is unduly retarded or advanced. Accordingly, ignition timing cannot be controlled appropriately.

SUMMARY OF THE INVENTION

An object of the present invention is to provide a device and the like for controlling ignition timing of an internal combustion engine that can appropriately control ignition timing.

A device for controlling ignition timing of an internal combustion engine according to one aspect of the present invention includes a knock sensor detecting magnitude of vibration occurring in the internal combustion engine and an operation unit connected to the knock sensor. The operation unit calculates knock magnitude related to magnitude of vibration due to knocking, based on the magnitude of vibration occurring in the internal combustion engine. The operation unit controls ignition timing of the internal combustion engine, based on a result of comparison between the knock magnitude and a predetermined determination value. The operation unit corrects the determination value, based on an occurrence frequency of knocking. The operation unit sets the determination value, when a difference between the magnitude of vibration occurring in the internal combustion engine and the determination value is greater than a predetermined value, to a value determined in accordance with the magnitude of vibration occurring in the internal combustion engine.

According to the present invention, knock magnitude related to magnitude of vibration due to knocking is calculated, based on the magnitude of vibration occurring in the internal combustion engine. Ignition timing of the internal combustion engine is controlled, based on a result of comparison between the knock magnitude and a predetermined determination value. For example, when the knock magnitude is greater than a predetermined determination value, it is determined that knocking has occurred and ignition timing is retarded. When the knock magnitude is smaller than the predetermined determination value, it is determined that knocking has not occurred and ignition timing is advanced. Meanwhile, magnitude of the same vibration occurring in the internal combustion engine may be detected as different values due to variation in the output values and degradation of the knock sensor, and thus knock magnitude may be calculated differently. In this case, ignition timing that has appropriately been controlled in the initial state of the internal combustion engine may not appropriately be controlled. Therefore, for example when it can be regarded that the occurrence frequency of knocking is high, it is necessary to correct the determination value in accordance with the state of vibration occurring in the internal combustion engine, so that retard control of ignition timing is performed frequently. Accordingly, the determination value is corrected based on the occurrence frequency of knocking. For example, when the occurrence frequency of knocking is higher than a predetermined frequency, the determination value is corrected to be smaller. This allows the retard control of ignition timing to be performed more frequently. Conversely, when the occurrence frequency of knocking is lower than a predetermined frequency, the determination value is corrected to be greater. This allows the advance control of ignition timing to be performed more frequently. Thus, it becomes possible to correct the determination value based on the occurrence frequency of knocking and to control ignition timing appropriately. However, if the determination value is excessively great or small relative to magnitude of vibration occurring in the internal combustion engine, it takes time until the determination value is ultimately corrected to an appropriate value with which ignition timing can appropriately be controlled. If the determination value is excessively great relative to magnitude of vibration occurring in the internal combustion engine, a state where the determination value is greater than the knocking magnitude continues. Thus, it may be determined that knocking has not occurred even though knocking has occurred, and ignition timing may be advanced. If the determination value is excessively small relative to magnitude of vibration occurring in the internal combustion engine, a state where the determination value is smaller than the knocking magnitude continues. Thus, it may be determined that knocking has occurred even though knocking has not occurred, and ignition timing may be retarded. In either case, ignition timing is controlled toward the direction contrary to the direction it actually should be controlled. Thus, knocking may unduly occur, or output of the internal combustion engine may become insufficient. Therefore, when a difference between the magnitude of vibration occurring in the internal combustion engine and the determination value is greater than a predetermined value, the determination value is set to a value determined in accordance with the magnitude of vibration occurring in the internal combustion engine. For example, the determination value is set to a value obtained by adding a predetermined value to the maximum value of the magnitudes of vibration occurring in the internal combustion engine. Thus, the determination value can approximate magnitude of vibration actually occurring in the internal combustion engine. This can suppress ignition timing from being advanced based on a determination that knocking has not occurred while it has occurred, or from being retarded based on a determination that knocking has occurred while it has not occurred. As a result, a device for controlling ignition timing of an internal combustion engine that can appropriately control ignition timing can be provided.

Preferably, the operation unit sets the determination value, when a difference between a maximum value of the magnitudes of vibration occurring in the internal combustion engine and the determination value is greater than the predetermined value, to a value determined in accordance with the magnitude of vibration occurring in the internal combustion engine.

According to the present invention, when a difference between a maximum value of the magnitudes of vibration occurring in the internal combustion engine and the determination value is greater than the predetermined value, the determination value is set to a value determined in accordance with the magnitude of vibration occurring in the internal combustion engine. Thus, when it can be regarded that the determination value is excessively great or small relative to the maximum magnitude, which is highly possibly the magnitude of vibration occurred due to knocking, the determination value can approximate magnitude of vibration actually occurring in the internal combustion engine. This can suppress ignition timing from being advanced based on a determination that knocking has not occurred while it has occurred, or from being retarded based on a determination that knocking has occurred while it has not occurred.

Further preferably, the operation unit sets the determination value to a value obtained by adding the predetermined value to the maximum value of the magnitudes of vibration occurring in the internal combustion engine.

According to the present invention, the determination value is set to a value obtained by adding the predetermined value to the maximum value of the magnitudes of vibration occurring in the internal combustion engine. Thus, the determination value can approximate the maximum magnitude, which is highly possibly the magnitude of vibration occurred due to knocking. This can suppress ignition timing from being advanced based on a determination that knocking has not occurred while it has occurred, or from being retarded based on a determination that knocking has occurred while it has not occurred.

A device for controlling ignition timing of an internal combustion engine according to another aspect of the present invention includes a knock sensor detecting magnitude of vibration occurring in the internal combustion engine and an operation unit connected to the knock sensor. The operation unit calculates knock magnitude related to magnitude of vibration due to knocking, based on the magnitude of vibration occurring in the internal combustion engine. The operation unit controls ignition timing of the internal combustion engine, based on a result of comparison between the knock magnitude and a predetermined determination value. The operation unit corrects the determination value, based on an occurrence frequency of knocking. When a difference between the magnitude of vibration occurring in the internal combustion engine and the determination value is greater than a predetermined value, the operation unit corrects the determination value by a greater amount than when the difference is smaller.

According to the present invention, knock magnitude related to magnitude of vibration due to knocking is calculated based on the magnitude of vibration occurring in the internal combustion engine. Ignition timing of the internal combustion engine is controlled based on a result of comparison between the knock magnitude and a predetermined determination value. For example, when the knock magnitude is greater than a predetermined determination value, it is determined that knocking has occurred and ignition timing is retarded. When the knock magnitude is smaller than the predetermined determination value, it is determined that knocking has not occurred and ignition timing is advanced. Meanwhile, magnitude of the same vibration occurring in the internal combustion engine may be detected as different values due to variation in the output values and degradation of the knock sensor, and thus knock magnitude may be calculated differently. In this case, ignition timing that has appropriately been controlled in the initial state of the internal combustion engine may not appropriately be controlled. Therefore, for example when it can be regarded that the occurrence frequency of knocking is high, it is necessary to correct the determination value in accordance with the state of vibration occurring in the internal combustion engine, so that retard control of ignition timing is performed frequently. Accordingly, the determination value is corrected based on the occurrence frequency of knocking. For example, when the occurrence frequency of knocking is higher than a predetermined frequency, the determination value is corrected to be smaller. This allows the retard control of ignition timing to be performed more frequently. Conversely, when the occurrence frequency of knocking is lower than a predetermined frequency, the determination value is corrected to be greater. This allows the advance control of ignition timing to be performed more frequently. Thus, it becomes possible to correct the determination value based on the occurrence frequency of knocking and to control ignition timing appropriately. However, if the determination value is excessively great or small relative to magnitude of vibration occurring in the internal combustion engine, it takes time until the determination value is ultimately corrected to an appropriate value with which ignition timing can appropriately be controlled. If the determination value is excessively great relative to magnitude of vibration occurring in the internal combustion engine, a state where the determination value is greater than the knocking magnitude continues. Thus, it may be determined that knocking has not occurred even though knocking has occurred, and ignition timing may be advanced. If the determination value is excessively small relative to magnitude of vibration occurring in the internal combustion engine, a state where the determination value is smaller than the knocking magnitude continues. Thus, it may be determined that knocking has occurred even though knocking has not occurred, and ignition timing may be retarded. In either case, ignition timing is controlled toward the direction contrary to the direction it actually should be controlled. Thus, knocking may unduly occur, or output of the internal combustion engine may become insufficient. Therefore, when a difference between the magnitude of vibration occurring in the internal combustion engine and the determination value is greater than a predetermined value, the determination value is corrected by a greater amount than when the difference is smaller. Thus, the determination value can quickly approximate magnitude of vibration actually occurring in the internal combustion engine. This can suppress ignition timing from being advanced based on a determination that knocking has not occurred while it has occurred, or from being retarded based on a determination that knocking has occurred while it has not occurred. As a result, a device for controlling ignition timing of an internal combustion engine that can appropriately control ignition timing can be provided.

Preferably, when a difference between a maximum value of the magnitudes of vibration occurring in the internal combustion engine and the determination value is greater than the predetermined value, the operation unit corrects the determination value by a greater amount than when the difference is smaller.

According to the present invention, when a difference between a maximum value of the magnitudes of vibration occurring in the internal combustion engine and the determination value is greater than the predetermined value, the determination value is corrected by a greater amount than when the difference is smaller. Thus, when it can be regarded that the determination value is excessively great or small relative to the maximum magnitude, which is highly possibly the magnitude of vibration occurred due to knocking, the determination value can quickly approximate magnitude of vibration actually occurring in the internal combustion engine. This can suppress ignition timing from being advanced based on a determination that knocking has not occurred while it has occurred, or from being retarded based on a determination that knocking has occurred while it has not occurred.

Further preferably, the operation unit corrects the determination value by a greater amount as a difference between a maximum value of the magnitudes of vibration occurring in the internal combustion engine and the determination value is greater.

According to the present invention, the determination value is corrected by a greater amount as a difference between a maximum value of the magnitudes of vibration occurring in the internal combustion engine and the determination value is greater. Thus, when it can be regarded that the determination value is excessively great or small relative to the maximum magnitude, which is highly possibly the magnitude of vibration occurred due to knocking, it will not take time until the determination value is corrected to an appropriate value with which ignition timing can appropriately be controlled. This can suppress ignition timing from being advanced based on a determination that knocking has not occurred while it has occurred, or from being retarded based on a determination that knocking has occurred while it has not occurred.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
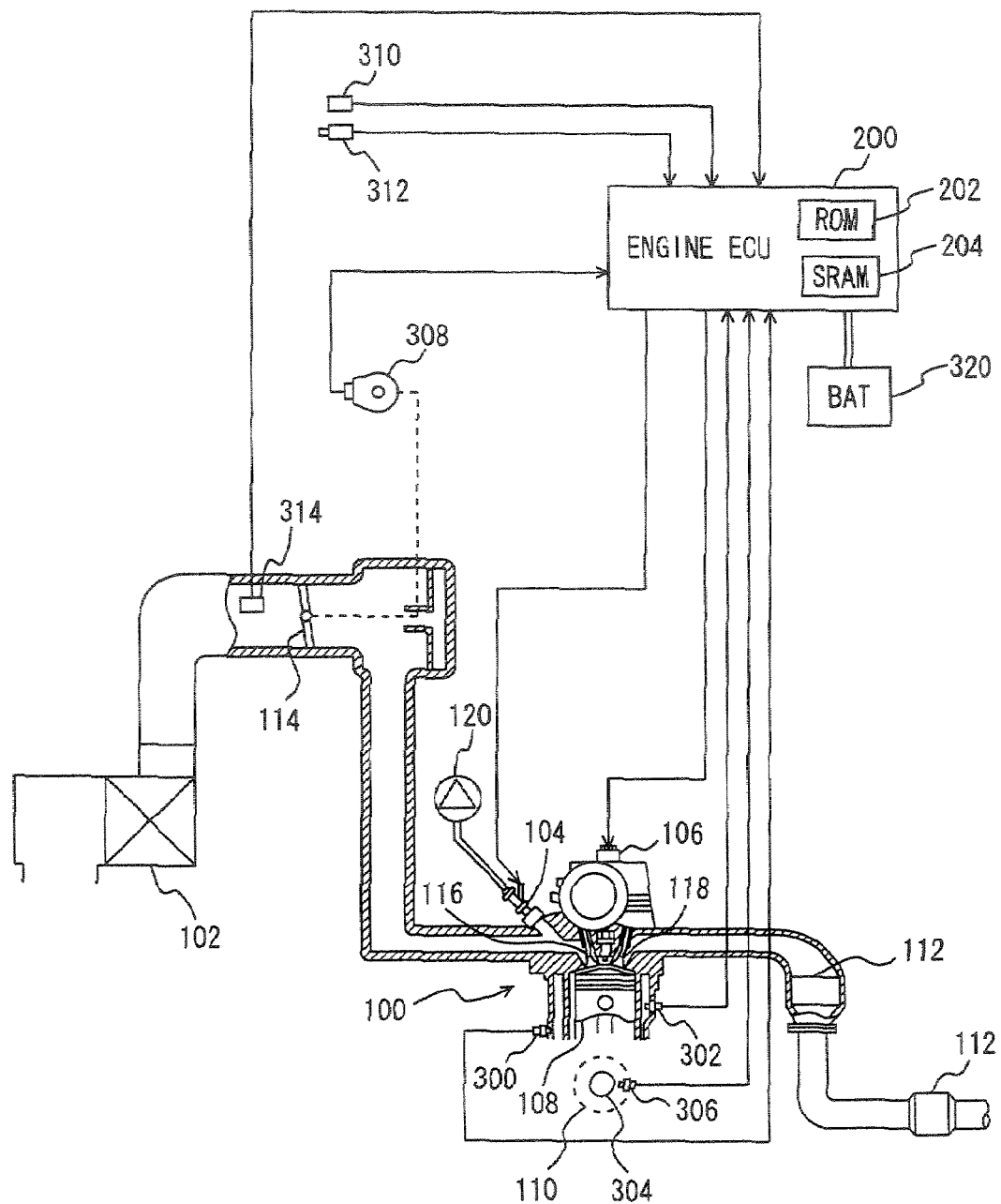
FIG. 1 is a schematic configuration diagram of an engine controlled by an engine ECU which is an ignition timing control device according to a first embodiment of the present invention.

Embodiments of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with an ignition timing control device according to the embodiment of the present invention will be described. Engine 100 is provided with a plurality of cylinders. The ignition timing control device according to the present invention is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air amount drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal representing a detection result to engine ECU 200.

Engine ECU 200 operates by electric power supplied from an auxiliary battery 320 that is a power supply. Engine ECU 200 performs computation based on signals sent from the respective sensors and ignition switch 312 and map and program stored in ROM (Read Only Memory) 202 or SRAM (Static Random Access Memory) 204 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle and determines whether or not knocking has occurred in engine 100 based on the detected vibration waveform. The knock detection gate in the embodiment is from a top dead center (0°) to 90° in a combustion stroke. The knock detection gate is not limited to it.

Figure 2:
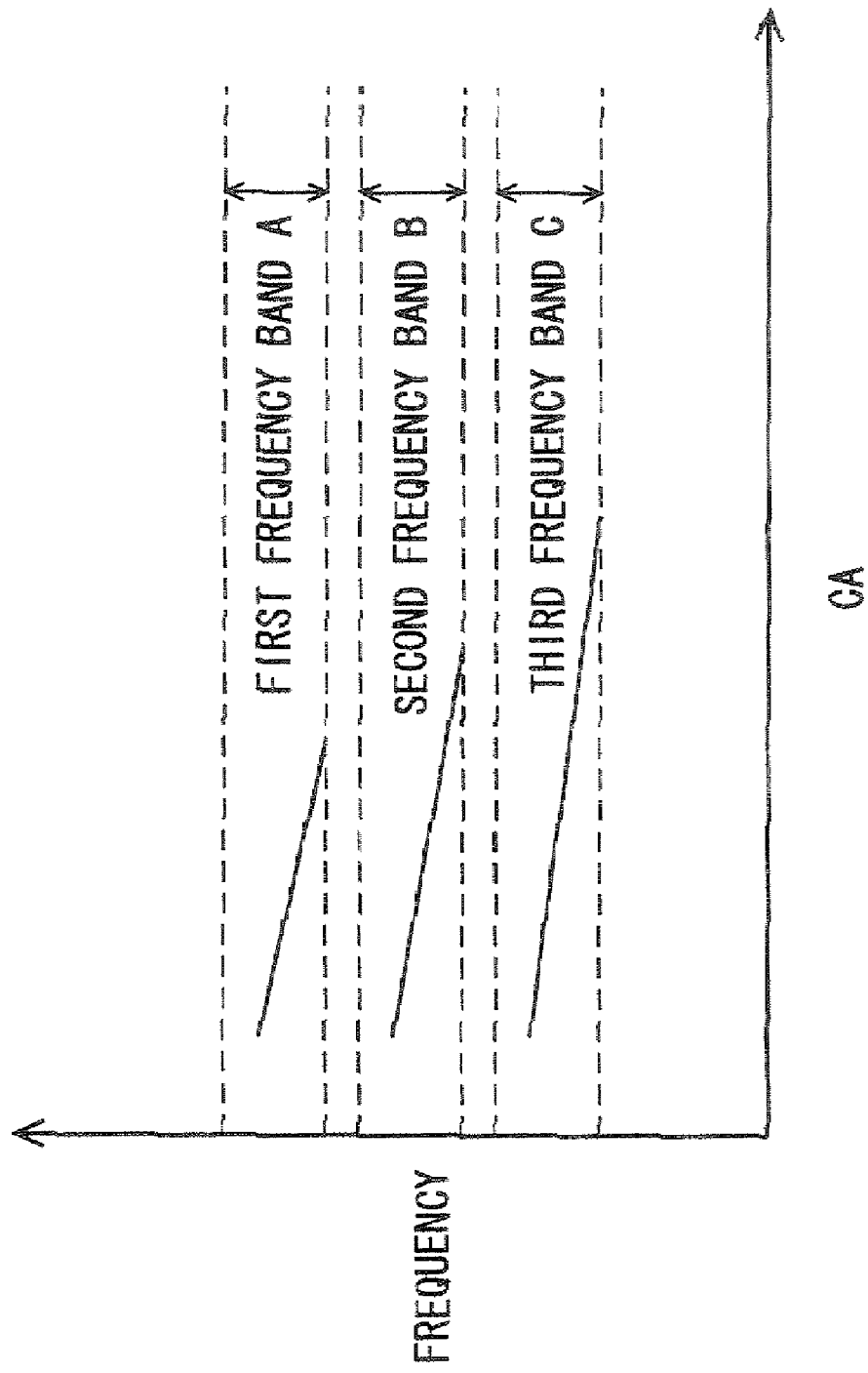
FIG. 2 is a chart showing frequency bands of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
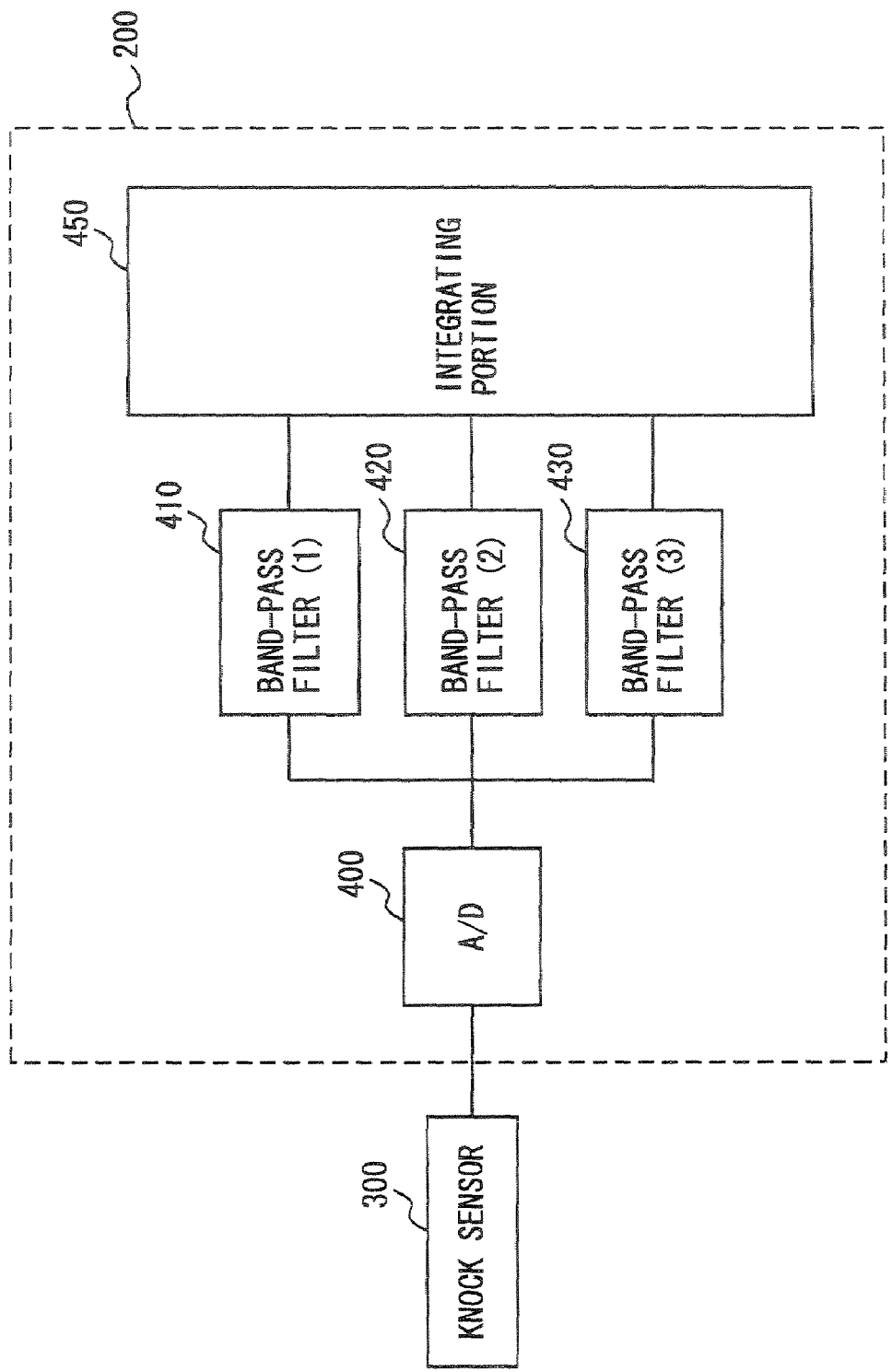
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating portion 450 integrates signals selected by the band-pass filters (1) 410 to (3) 430, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
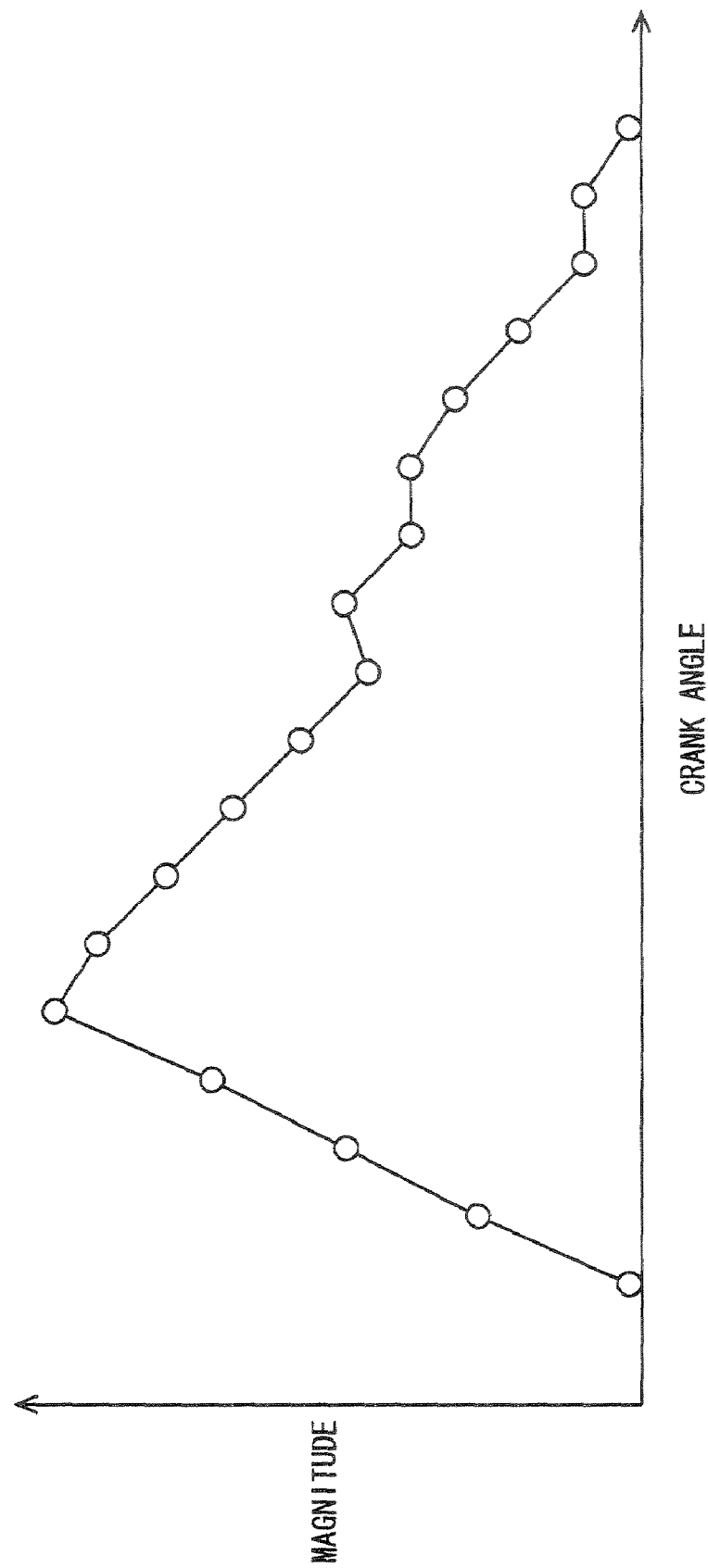
FIG. 4 is a chart showing a waveform of vibration in the engine.

As a result, as shown in FIG. 4, a vibration waveform of engine 100 is detected. In other words, the synthesized waveform of the first to third frequency bands A to C are used as the vibration waveform of engine 100.

Figure 5:
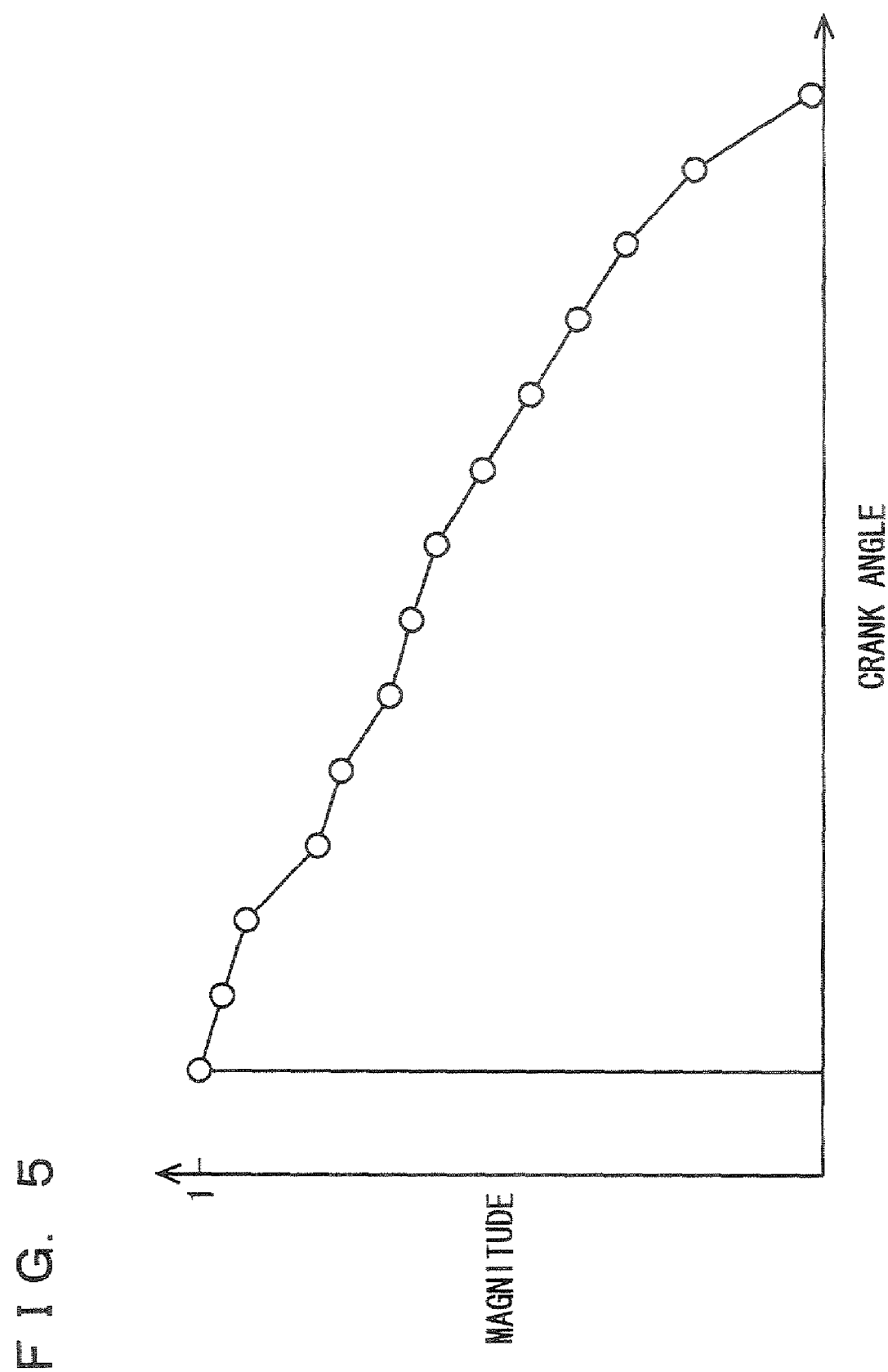
FIG. 5 is a chart showing a knock waveform model stored in ROM of the engine ECU.

The detected vibration waveform is compared with a knock waveform model stored in ROM 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in a case in which the knocking is forcibly generated in the median characteristic engine. A method of forming the knock waveform model is not limited to it and it is also possible to form the model by simulation.

Figure 6:
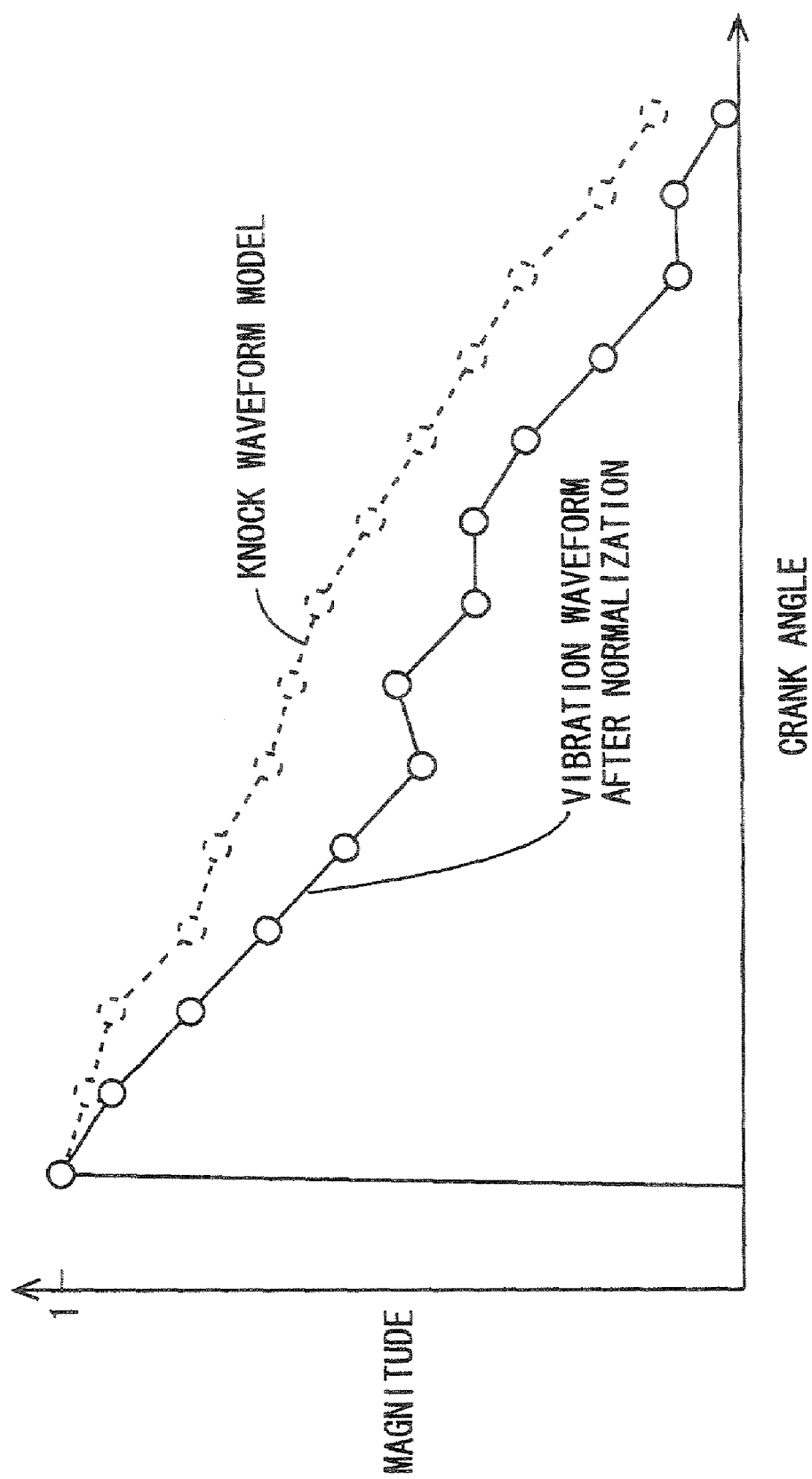
FIG. 6 is a chart for comparing the vibration waveform with the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at each crank angle (at every 5° of crank angle) to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of vibration in the knock waveform model by the crank angle is S, correlation coefficient K is calculated by an equation, $K=(S-\Sigma\Delta S(I))/S$, where $\Sigma\Delta S(I)$ is the total of $\Delta S(I)$. In the embodiment, the closer a shape of the vibration waveform to a shape of the knock waveform model, the greater value correlation coefficient K is calculated as. Therefore, if a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on the maximum value (peak value) of the integrated values. If the maximum integrated value is P and a value representing the magnitude of vibration of engine 100 where knocking does not occur is BGL (Back Ground Level), knock magnitude N is calculated by an equation, N=P/BGL. It is noted that maximum integrated value P used in calculating knock magnitude N is logarithmically converted. A method of calculating knock magnitude N is not limited to it.

BGL is calculated as a value obtained by subtracting the product of a standard deviation σ and a coefficient (for example "1") from a median value V(50) in the frequency distribution of magnitude values LOG(V), which will be described later. A method of calculating BGL is not limited to it, and BGL may also be stored in ROM 202 in advance.

In the embodiment, engine ECU 200 compares calculated knock magnitude N and a determination value V(KX) stored in SRAM 204 with each other, and further compares the detected waveform and the stored knock waveform model with each other. Then engine ECU 200 determines whether or not knocking has occurred in engine 100 for every ignition cycle.

Figure 7:
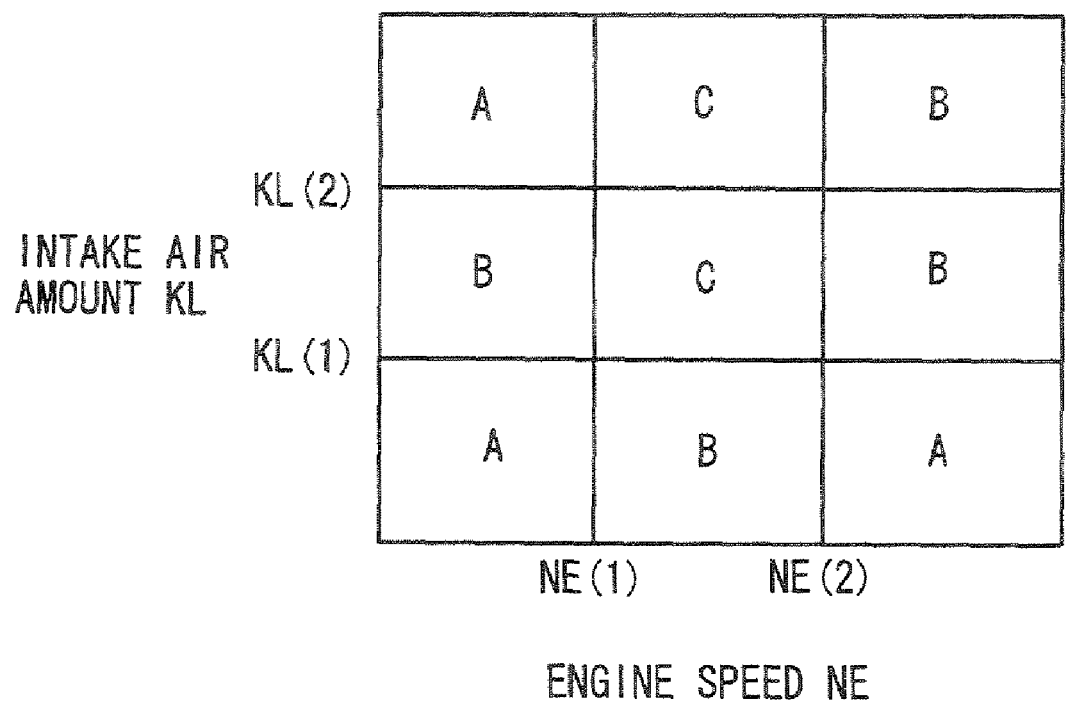
FIG. 7 is a chart showing a map of a determination value V(KX) stored in the ROM or SRAM of the engine ECU.

As shown in FIG. 7, determination values V(KX) are stored as a map for each range divided by an operation state using an engine speed NE and an intake air amount KL as parameters. In the embodiment, nine ranges for each cylinder are provided, which are divided as follows: low speed (NE<NE(1)); medium speed (NE(1)≦NE<NE(2)); high speed (NE(2)≦NE), low load (KL<KL(1)); medium load (KL(1)≦KL<KL(2)); and high load (KL(2)≦KL). The number of the ranges is not limited to it. The ranges may be divided using parameters other than engine speed NE and intake air amount KL.

At the time of shipment of engine 100 or the vehicle, a value determined in advance by an experiment or the like is used as determination value V(KX) stored in ROM 202 (an initial value of determination value V(KX) at the time of shipment). However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in the embodiment, a knock determination level V(KD) is calculated based on frequency distribution representing a relationship between a magnitude value LOG(V) which is a value obtained by logarithmically converting magnitudes V and a frequency (the number of times, a probability) of detection of each magnitude value LOG(V).

Magnitude value LOG(V) is calculated for each range in which engine speed NE and intake air amount KL are used as parameters. Magnitude V used for calculating magnitude value LOG(V) is a peak value (peak value of integrated values at every 5°) of magnitudes between predetermined crank angles. Based on calculated magnitude value LOG(V), median value V(50) at which the accumulative sum of frequencies of magnitudes LOG(V) from the minimum value reaches 50% is calculated. Furthermore, a standard deviation σ of magnitude values LOG(V) equal to or smaller than median value V(50) is calculated. For example, in the embodiment, a median value V(50) and a standard deviation σ, which approximate the median value and standard deviation calculated based on a plurality of magnitude values LOG (V) (e.g., 200 cycles), are calculated for each ignition cycle by the following calculation method.

If a currently detected magnitude value LOG(V) is greater than a previously calculated median value V(50), then a value obtained by adding a predetermined value C(1) to the previously calculated median value V(50) is calculated as a current median value V(50). On the other hand, if a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

If a currently detected magnitude value LOG(V) is smaller than a previously calculated median value V(50) and greater than a value obtained by subtracting a previously calculated standard deviation σ from the previously calculated median value V(50), then a value obtained by subtracting a value twice as large as a predetermined value C(3) from the previously calculated standard deviation σ is calculated as a current standard deviation σ. On the other hand, if a currently detected magnitude value LOG(V) is greater than a previously calculated median value V(50) or smaller than a value obtained by subtracting a previously calculated standard deviation σ from the previously calculated median value V(50), then a value obtained by adding a predetermined value C(4) (e.g., C(3) and C(4) are the same value) to the previously calculated standard deviation σ is calculated as a current standard deviation σ. A method of calculating median value V(50) and standard deviation σ is not limited to it. Also, initial values of median value V(50) and standard deviation σ may be values set in advance or may be "0".

Figure 8:
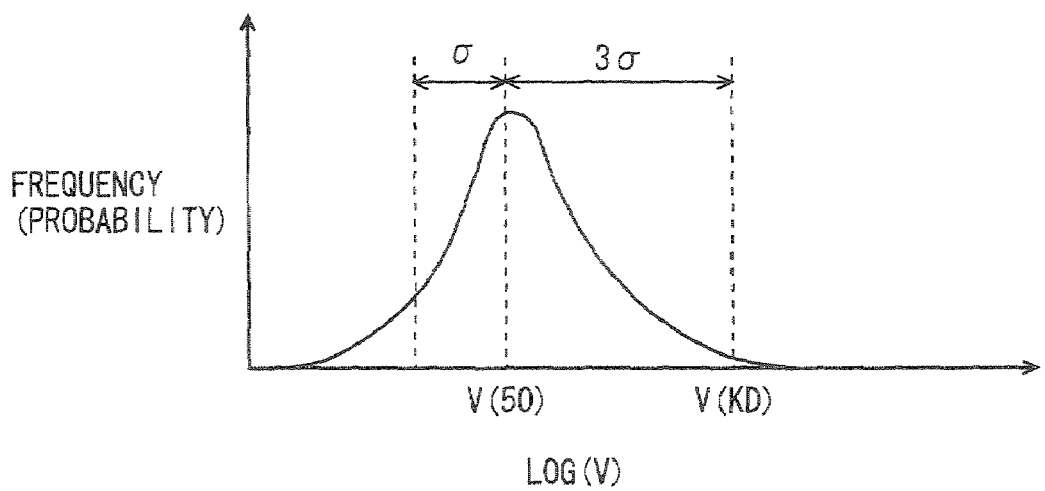
FIG. 8 is a chart (No. 1) showing frequency distribution of magnitude values LOG(V)

Using median value V(50) and standard deviation σ, a knock determination level V(KD) is calculated. As shown in FIG. 8, a value obtained by adding the product of a coefficient U(1) (U(1) is a constant and U(1)=3, for example) and standard deviation σ to median value V(50) is a knock determination level V(KD). A method of calculating knock determination level V(KD) is not limited to it. It is determined that the frequency of magnitude values LOG(V) greater than knock determination level V(KD) is a frequency of occurrence of knocking. Based on the frequency of occurrence of knocking, determination value V(KX) is corrected. The frequency distribution of magnitude values LOG(V) is formed for each range described above, and determination value V(KX) of each range is corrected.

Coefficient U(1) is a coefficient obtained based on data and findings obtained by experiments and the like. Magnitude value LOG(V) greater than knock determination level V(KD) when U(1)=3 substantially agrees with magnitude value LOG(V) in an ignition cycle in which knocking has actually occurred. It is also possible to use other values than "3" as coefficient U(1).

Figure 9:
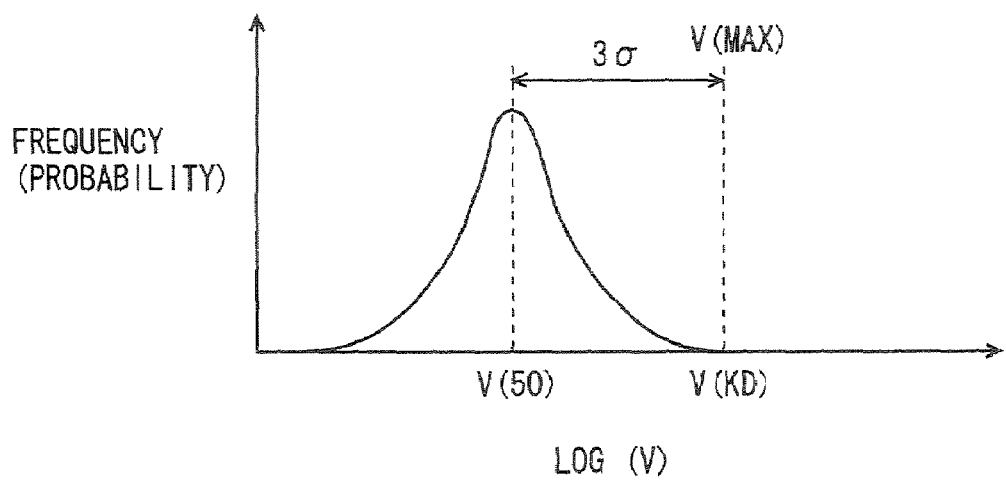
FIG. 9 is a chart (No. 2) showing frequency distribution of magnitude values LOG(V)
Figure 10:
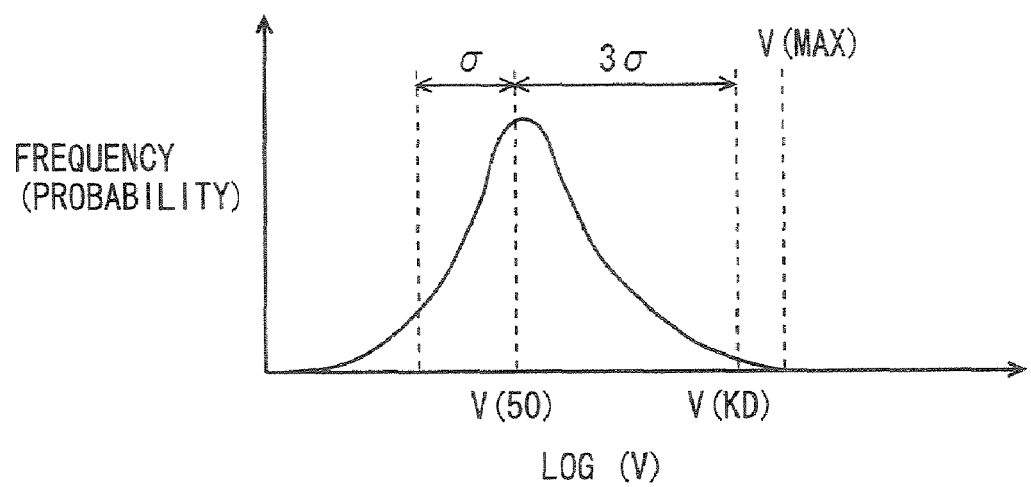
FIG. 10 is a chart (No. 3) showing frequency distribution of magnitude values LOG(V)

If knocking is not occurring in engine 100, the frequency distribution of magnitude values LOG(V) becomes normal distribution as shown in FIG. 9, and maximum value V(MAX) of magnitude value LOG(V) and knock determination level V(KD) agree with each other. On the other hand, by the occurrence of knocking, a greater magnitude V is detected. When a great magnitude value LOG(V) is calculated, as shown in FIG. 10, maximum value V(MAX) becomes greater than knock determination level V(KD).

Figure 11:
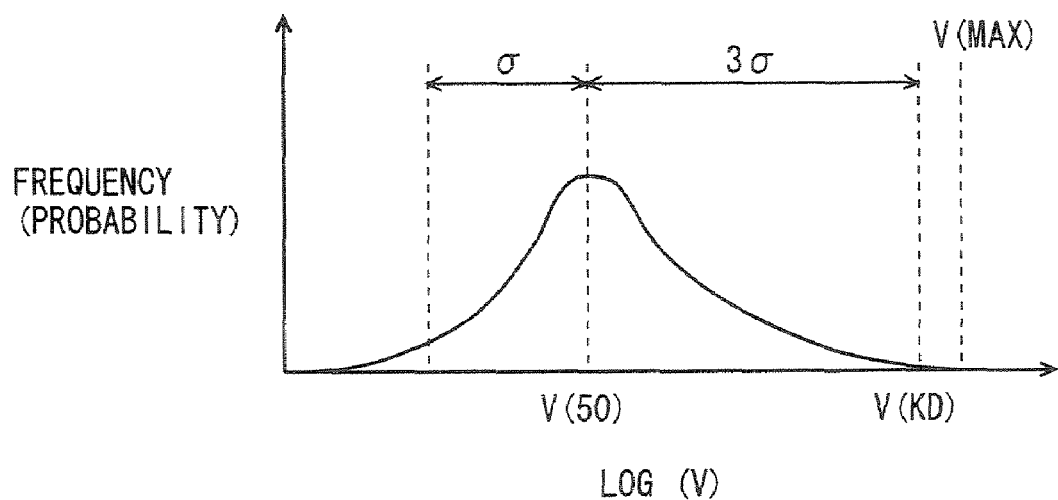
FIG. 11 is a chart (No. 4) showing frequency distribution of magnitude values LOG(V)

When the frequency of occurrence of knocking becomes further higher, as shown in FIG. 11, maximum value V(MAX) becomes further greater. Median value V(50) and standard deviation σ in the frequency distribution become greater as maximum value V(MAX) does. As a result, knock determination level V(KD) becomes greater.

A magnitude value LOG(V) smaller than knock determination level V(KD) is not determined as a magnitude value LOG(V) in a cycle in which a knocking has occurred. Therefore, as knock determination level V(KD) becomes greater, the frequency of determining that knocking has not occurred while knocking has actually occurred becomes greater.

Figure 12:
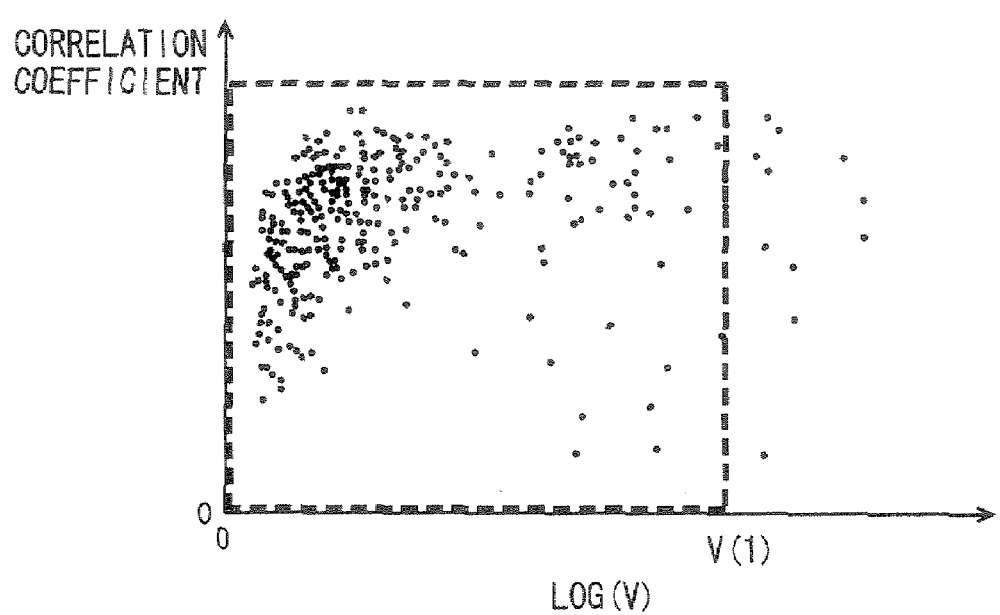
FIG. 12 is a chart showing magnitude values LOG(V) used for forming the frequency distribution of the magnitude values LOG(V)

Therefore, in the embodiment, magnitude values LOG(V) in a range surrounded with a broken line in FIG. 12 are used to exclude magnitude values LOG(V) greater than a threshold value V(1), to thereby obtain median value V(50) and standard deviation σ. FIG. 12 is a chart in which calculated magnitude values LOG(V) are plotted for each correlation coefficient K in a cycle in which the magnitude values LOG(V) are obtained.

Threshold value V(1) is a value obtained by adding, to a median value of frequency distribution of magnitude values LOG(V), the product of a coefficient U(2) (U(2) is a constant and U(2)=3, for example) and a standard deviation of magnitude values LOG(V) equal to or smaller than the median value.

By extracting only magnitude values LOG(V) smaller than threshold value V(1) to calculate median value V(50) and standard deviation σ, median value V(50) and standard deviation σ do not become excessively great, and become stable values. As a result, knock determination level V(KD) can be suppressed from becoming excessively high. Therefore, the frequency of determining that knocking has not occurred while knocking has actually occurred can be suppressed from becoming high.

The method of extracting magnitude values LOG(V) used for calculating median value V(50) and standard deviation σ is not limited to it. For example, out of magnitude values LOG(V) smaller than threshold value V(1) described above, magnitude values LOG(V) calculated in the ignition cycles in which correlation coefficient K is greater than threshold value K(1) may be extracted.

Figure 13:
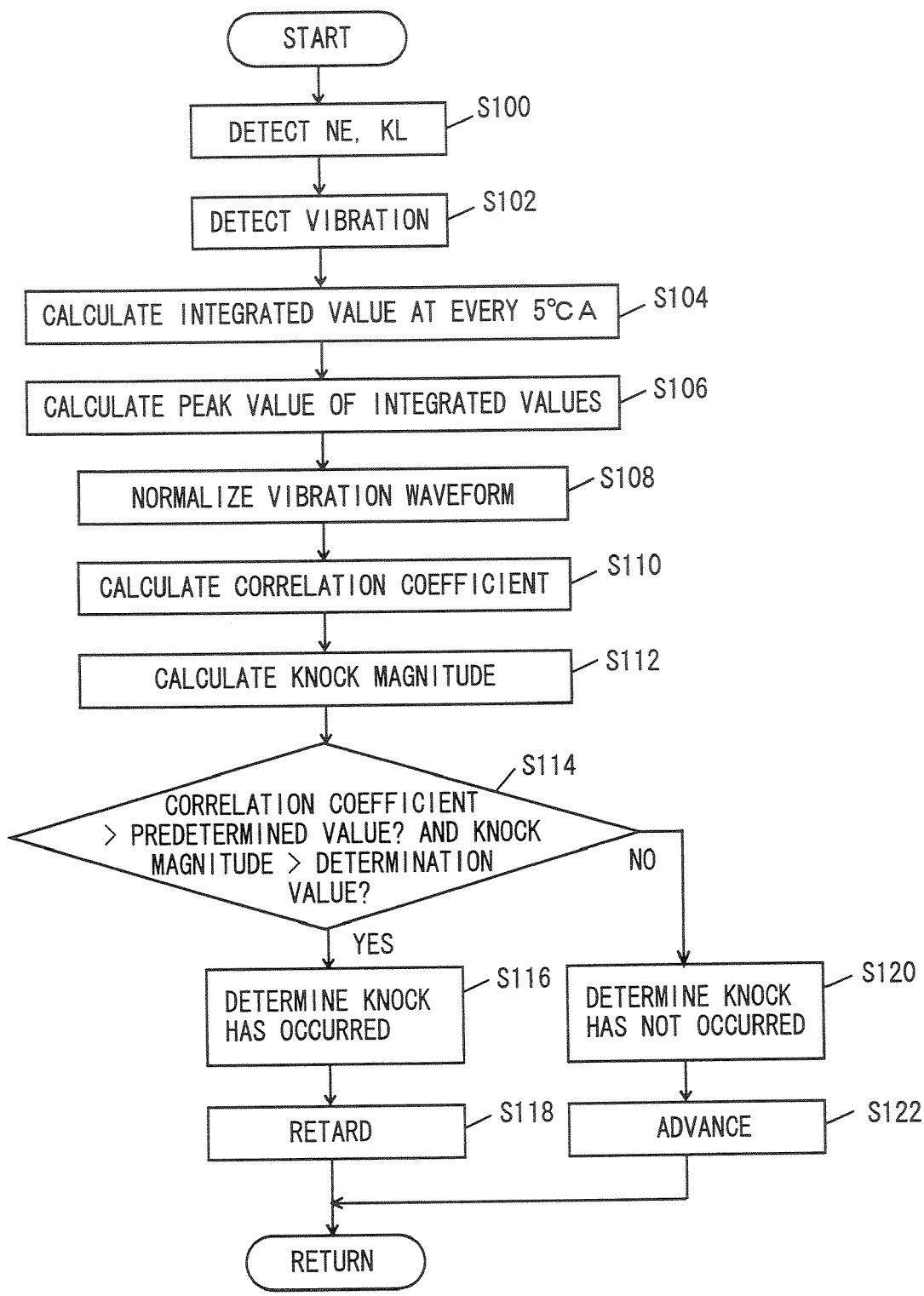
FIG. 13 is a flowchart (No. 1) showing a control structure of the program executed by the engine ECU which is the ignition timing control device according to the first embodiment of the present invention.

With reference to FIG. 13, a control structure of a program executed by engine ECU 200 which is the ignition timing control device according to the embodiment so as to control the ignition timing by determining whether or not knocking has occurred in each ignition cycle will be described.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 calculates the largest integrated value (peak value P) out of integrated values in a synthesized waveform (vibration waveform of engine 100) of the first to third frequency bands A to C.

In S108, engine ECU 200 normalizes the vibration waveform of engine 100. Here, normalization means to express the magnitude of the vibration as a dimensionless number in a range of 0 to 1 by dividing each integrated value by the calculated peak value.

In S110, engine ECU 200 calculates correlation coefficient K which is a value related to the deviation of the normalized vibration waveform and the knock waveform model from each other. In S112, engine ECU 200 calculates a knock magnitude N.

In S114, engine ECU 200 determines whether correlation coefficient K is greater than a predetermined value and knock magnitude N is greater than determination value V(KX). If correlation coefficient K is greater than a predetermined value and knock magnitude N is greater than determination value V(KX) (YES in S114), the processing moves to S116. Otherwise (NO in S114), the processing moves to S120.

In S116, engine ECU 200 determines that knocking has occurred in engine 100. In S118, engine ECU 200 retards the ignition timing. In S120, engine ECU 200 determines that knocking has not occurred in engine 100. In S122, engine ECU 200 advances the ignition timing.

Figure 14:
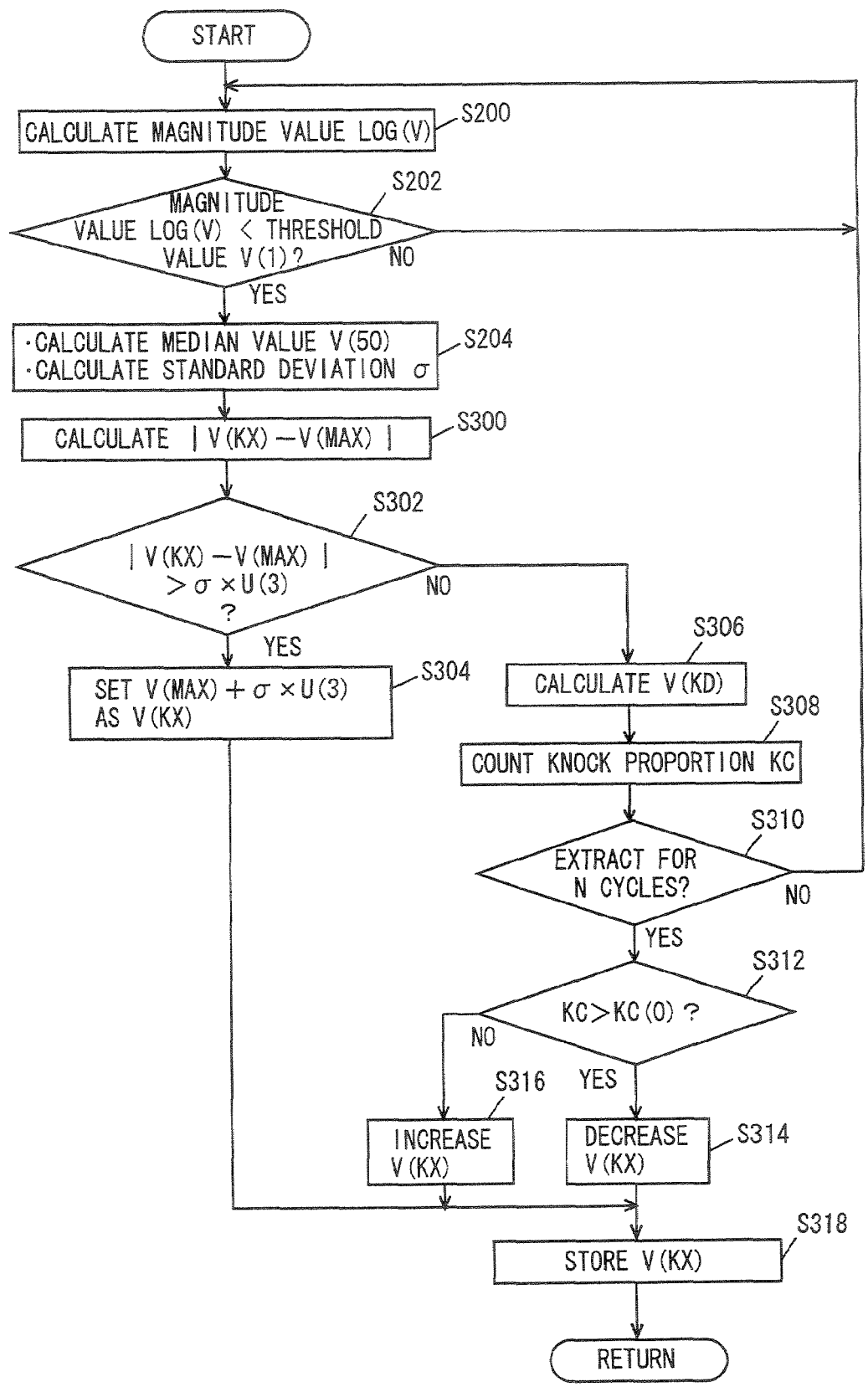
FIG. 14 is a flowchart (No. 2) showing the control structure of the program executed by the engine ECU which is the ignition timing control device according to the first embodiment of the present invention.
Figure 15:
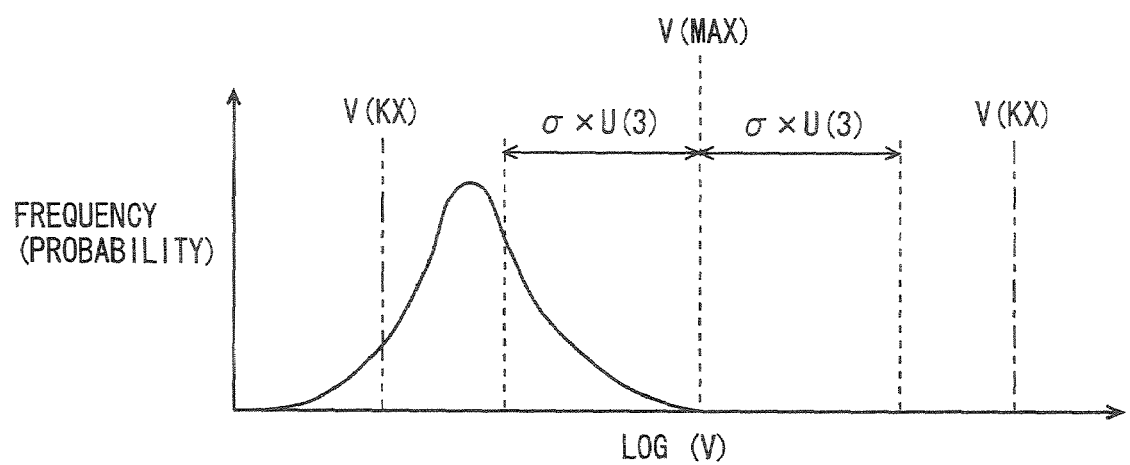
FIG. 15 is a chart showing frequency distribution of magnitude values LOG(V) and determination value V(KX)

With reference to FIGS. 14 and 15, a control structure of a program executed by engine ECU 200 which is the ignition timing control device according to the embodiment so as to set determination value V(KX) in starting engine 1000 will be described.

In S200, engine ECU 200 calculates magnitude value LOG (V) from magnitude V detected based on a signal transmitted from knock sensor 300. Magnitude V is a peak value (peak value of integrated values at every 5°) between predetermined crank angles.

In S202, engine ECU 200 determines whether magnitude value LOG(V) is smaller than the aforementioned threshold value V(1). When magnitude value LOG(V) is smaller than the aforementioned threshold value V(1) (YES in S202), the processing moves to S204. Otherwise (NO in S202), the processing goes back to S200.

In S204, engine ECU 200 calculates median value V(50) and standard deviation σ of the extracted magnitude value LOG(V). It is noted that median value V(50) and standard deviation σ may be calculated every time magnitude values LOG(V) for N cycle(s) (N is a natural number and N=200, for example) are extracted.

In S300, engine ECU 200 calculates an absolute value of the difference between current determination value V(KX) and maximum value V(MAX) of magnitude value LOG(V).

In S302, engine ECU 200 determines whether or not the absolute value of the difference between current determination value V(KX) and maximum value V(MAX) of magnitude value LOG(V) is greater than the product of standard deviation σ and a coefficient U(3) (U(3) is a constant and U(3)=3, for example). When the absolute value of the difference between current determination value V(KX) and maximum value V(MAX) of magnitude value LOG(V) is greater than the product of standard deviation σ and coefficient U(3) (YES in S302), the processing moves to S304. Otherwise (NO in S302), the processing moves to S306. It is noted that, in place of the product of standard deviation σ and a coefficient U(3), other predetermined value may be used.

In S304, engine ECU 200 set as determination value V(KX) a value obtained by adding the product of standard deviation σ and a coefficient U(3) to maximum value V(MAX) of magnitude value LOG(V).

In S306, engine ECU 200 calculates knock determination level V(KD) based on median value V(50) and standard deviation σ.

In S308, engine ECU 200 counts the proportion of magnitude values LOG(V) greater than knock determination level V(KD) to the extracted magnitude values LOG(V) as a knock proportion KC.

In S310, engine ECU 200 determines whether or not magnitude values LOG (V) for N cycle(s) since previous determination value V(KX) was corrected are extracted. When magnitude values LOG (V) for N cycle(s) are extracted (YES in S310), the processing moves to S312. Otherwise (NO in S310), the processing goes back to S300.

In S312, engine ECU 200 determines whether or not knock proportion KC is greater than a threshold value KC(0). If knock proportion KC is greater than threshold value KC(0) (YES in S312), the processing moves to S314. Otherwise (NO in S312), the processing moves to S316.

In S314, engine ECU 200 decreases determination value V(KX) by a predetermined correction amount. In S316, engine ECU 200 increases determination value V(KX) by a predetermined correction amount.

In S318, engine ECU 200 stores determination value V(KX) in SRAM 204. Thereafter, the processing ends.

Operation of engine ECU 200 which is the ignition timing control device according to the embodiment based on the above configuration and flowcharts will be described.

During an operation of engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every five degrees is used to detect a vibration waveform, it becomes possible to detect a vibration waveform of which delicate variations are suppressed. Therefore, it becomes easy to compare the detected vibration waveform and the knock waveform model with each other.

Based on the calculated integrated values, peak value P of the integrated values in the synthesized waveform (vibration waveform of engine 100) of the first to third frequency bands A to C is calculated (S106).

The integrated value in the vibration waveform of engine 100 is divided by the calculated peak value P to thereby normalize the vibration waveform (S108). By normalization, the magnitudes of the vibrations in the vibration waveform are expressed as dimensionless numbers in a range of 0 to 1. In this manner, it is possible to compare the detected vibration waveform and the knock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value ΔS(I) of the deviation of the vibration waveform after the normalization and the knock waveform model from each other at each crank angle is calculated. Based on the total of ΔS(I), i.e., ΣΔS(I) and value S obtained by integrating the magnitude of the vibration in the knock waveform model by the crank angle, correlation coefficient K is calculated by K=(S−ΣΔS(I))/S (S110). In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

Furthermore, knock magnitude N is calculated by dividing peak value P (a value obtained by logarithmically converting peak value P) by BGL (S112). Thus, it becomes possible to analyze in more detail whether or not vibration of engine 100 is due to knocking based on the magnitude of vibration.

If correlation coefficient K is greater than a predetermined value and knock magnitude N is greater than a predetermined determination value V(KX) (YES in S114), it is determined that knocking has occurred (S116) and the ignition timing is retarded (S118). As a result, occurrence of the knocking is suppressed. If correlation coefficient K is not greater than a predetermined value or knock magnitude N is not greater than a predetermined determination value (NO in S114), it is determined that knocking has not occurred (S120) and the ignition timing is advanced (S122). Thus, by comparing knock magnitude N and determination value V(KX) with each other, whether or not knocking has occurred is determined for each ignition cycle, and the ignition timing is retarded or advanced.

Meanwhile, a magnitude of the same vibration occurring in engine 100 may be detected as different values due to variation in the output values and degradation of knock sensor 300. In such a case, it is necessary to correct determination value V(KX) and to determine whether or not knocking has occurred by using determination value V(KX) corresponding to the magnitude detected actually.

Therefore, in engine ECU 200 that is the ignition timing control device according to the embodiment, magnitude value LOG(V) is calculated (S200). When the calculated magnitude value LOG(V) is smaller than the above-described threshold value V(1) (YES in S202), median value V(50) and standard deviation σ are calculated (S204).

When an absolute value of the difference between current determination value V(KX) and maximum value V(MAX) of magnitude value LOG(V) is equal to or smaller than the product of standard deviation σ and coefficient U(3) (NO in S302), a knock determination level V(KD) is calculated based on median value V(50) and standard deviation σ (S306). The proportion of magnitude values LOG(V) greater than determination level V(KD) is counted as a knock proportion KC (S308). When magnitude values LOG (V) for N cycle(s) since previous determination value V(KX) was corrected are extracted (YES in S310) and knock proportion KC is greater than threshold value KC(0) (YES in S312), determination value V(KX) is decreased so that the frequency of retard control of ignition timing (S118) being performed becomes higher (S314). When knock proportion KC is smaller than threshold value KC(0) (NO in S312), determination value V(KX) is increased so that the frequency of advance control of ignition timing (S122) being performed becomes higher (S316). Thus, the determination value V(KX) in knocking determination for each ignition cycle can appropriately be corrected to thereby control the ignition timing appropriately.

On the other hand, as shown in FIG. 15 by an alternate long and short dashes line, if current determination value V(KX) is excessively great for the magnitude of vibration occurring in engine 100, a state where determination value V(KX) is great relative to knock magnitude N being calculated continues. Thus, it is determined that knocking has not occurred (S120) and the frequency of advancing ignition timing (S122) becomes higher.

In this case, since knocking actually occurs frequently, by correcting determination value V(KX) using a frequency distribution of LOG(V), magnitude value V(KX) is decreased (S314). Thus, ultimately determination value V(KX) converges to an appropriate value with which ignition timing can be controlled appropriately. However, until it converges to an appropriate value, ignition timing may be advanced even though knocking has occurred.

Furthermore, as shown in FIG. 15 by an alternate long and two short dashes line, if current determination value V(KX) is excessively small for the magnitude of vibration occurring in engine 100, a state where determination value V(KX) is small relative to knock magnitude N being calculated continues. Thus, it is determined that knocking has occurred (S116) and the frequency of retarding ignition timing (S118) becomes higher.

In this case, since knocking actually occurs less frequently, by correcting determination value V(KX) using a frequency distribution of LOG(V), magnitude value V(KX) is increased (S316). Thus, ultimately determination value V(KX) converges to an appropriate value with which ignition timing can be controlled appropriately. However, until it converges to an appropriate value, ignition timing may be retarded even though knocking has not occurred.

In either case, ignition timing may be controlled toward the direction contrary to the direction it actually should be controlled. Thus, knocking may unduly occur, or output of engine 100 may become insufficient. Therefore, when the absolute value of the difference between current determination value V(KX) and maximum value V(MAX) of magnitude value LOG(V) is greater than the product of standard deviation σ and coefficient U(3) (YES in S302), and if it can be regarded that determination value V(KX) is excessively great or small, a value obtained by adding the product of standard deviation σ and a coefficient U(3) to maximum value V(MAX) of magnitude value LOG(V) is set as determination value V(KX) (S304).

Thus, determination value V(KX) can approximate the magnitude of actual magnitude value LOG(V). This can suppress ignition timing from being advanced based on a determination that knocking has not occurred while it has occurred, or from being retarded based on a determination that knocking has occurred while it has not occurred. As a result, ignition timing can be controlled appropriately.

As above, according to the engine ECU that is an ignition timing control device according to the embodiment, when the absolute value of the difference between current determination value V(KX) and maximum value V(MAX) of magnitude value LOG(V) is greater than the product of standard deviation σ and coefficient U(3), a value obtained by adding the product of standard deviation σ and a coefficient U(3) to maximum value V(MAX) of magnitude value LOG(V) is set as determination value V(KX). Thus, determination value V(KX) is suppressed from becoming excessively great or small relative to the magnitude of vibration occurring in the engine. This can suppress ignition timing from being advanced based on a determination that knocking has not occurred while it has occurred, or from being retarded based on a determination that knocking has occurred while it has not occurred. As a result, ignition timing can be controlled appropriately.

It is noted that, in an operation condition where knocking cannot occur, such as in an idle state, when the absolute value of the difference between current determination value V(KX) and maximum value V(MAX) of magnitude value LOG(V) is greater than the product of standard deviation σ and coefficient U(3), a value obtained by adding the product of standard deviation σ and a coefficient U(3) to maximum value V(MAX) of magnitude value LOG(V) may be set as determination value V(KX).

Furthermore, in place of the value obtained by adding the product of standard deviation σ and a coefficient U(3) to maximum value V(MAX) of magnitude value LOG(V), maximum value V(MAX) of magnitude value LOG(V), a predetermined value or the like may be set as determination value V(KX).

Furthermore, when the absolute value of the difference between current determination value V(KX) and maximum value V(MAX) of magnitude value LOG(V) is greater than the product of standard deviation σ and coefficient U(3), a correction amount of determination value V(KX) may be increased. In this case, the correction amount may be made greater as the absolute value of the difference between current determination value V(KX) and maximum value V(MAX) of magnitude value LOG(V) is greater. Furthermore, the correction amount may be made smaller as the absolute value of the difference between current determination value V(KX) and maximum value V(MAX) of magnitude value LOG(V) is smaller.

Furthermore, in place of maximum value V(MAX) of magnitude value LOG(V), or when the absolute value of the difference between a value obtained (calculated) from magnitude value LOG(V) and determination value V(KX) is greater than a threshold value, determination value V(KX) may be set to a predetermined value or a correction amount may be increased.

Figure 16:
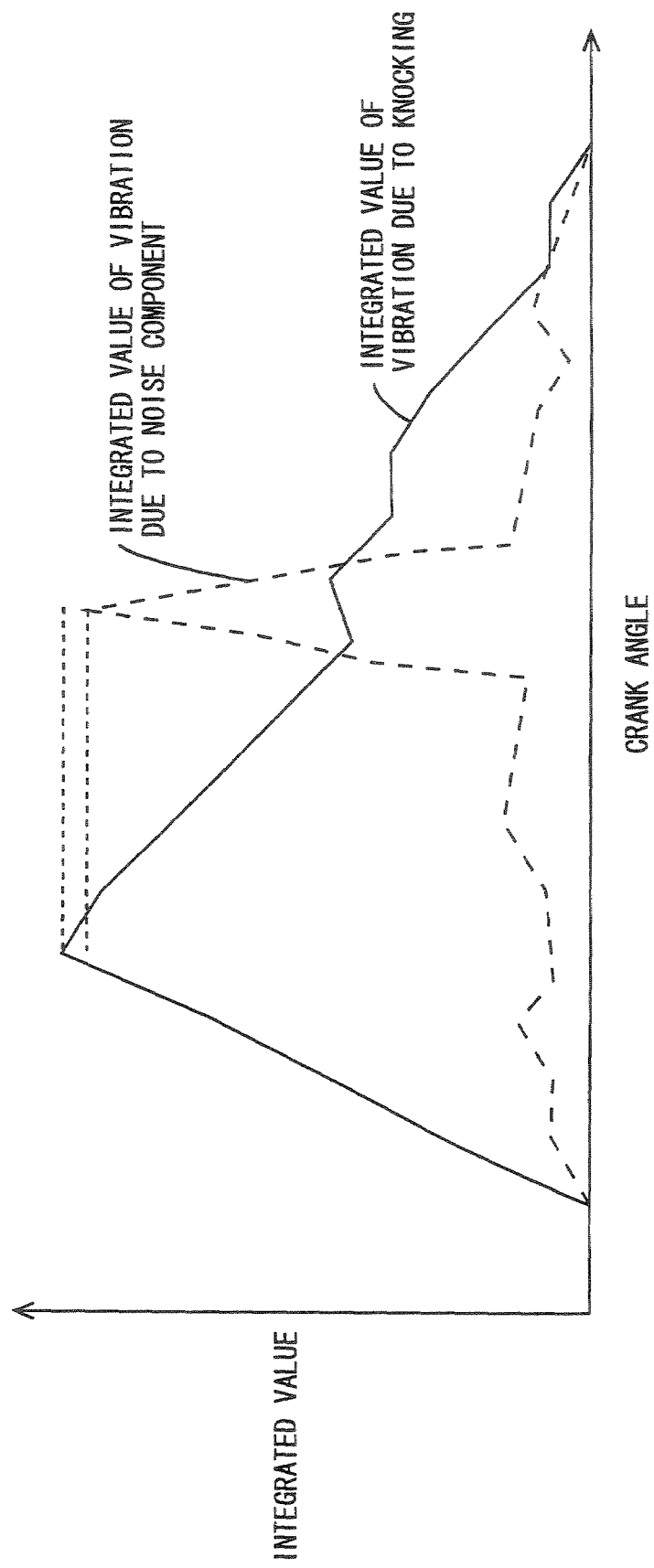
FIG. 16 is a chart (No. 1) showing an integrated value at the time of knocking and an integrated value by noise.
Figure 17:
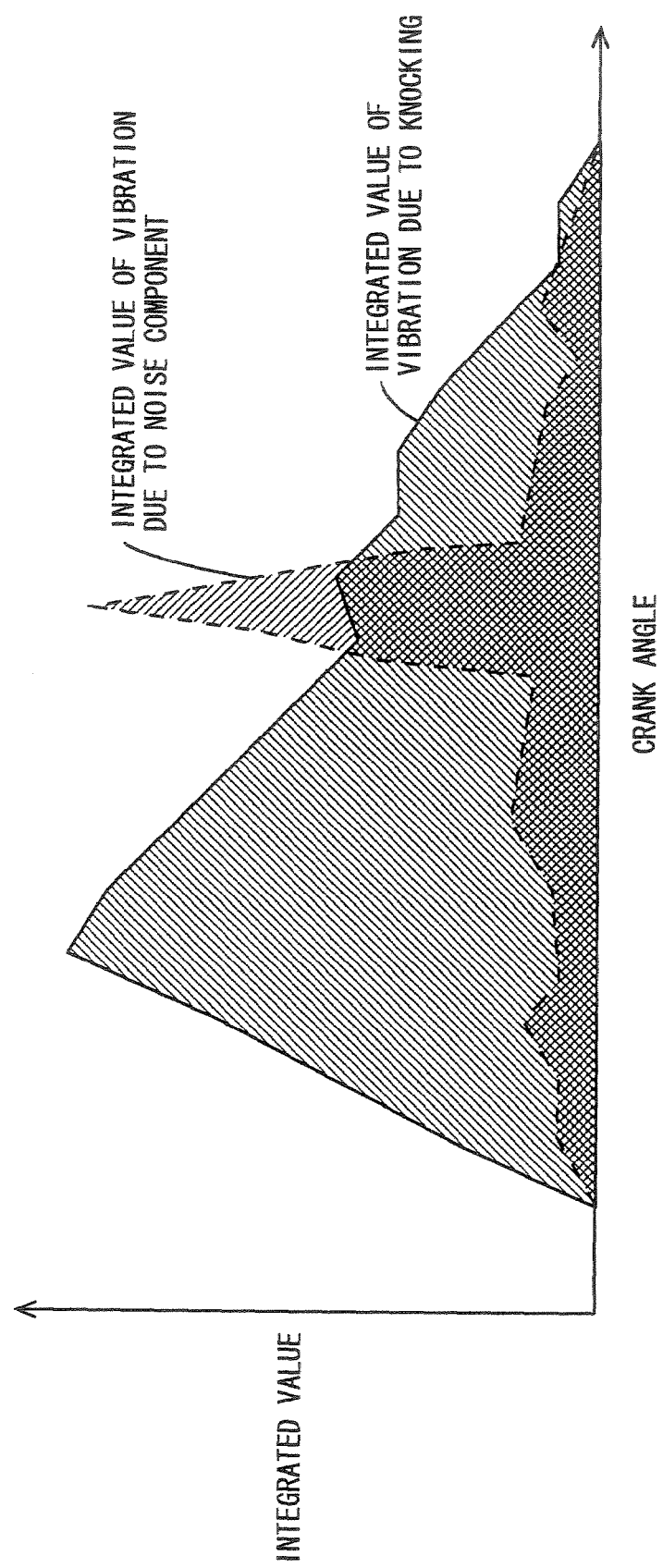
FIG. 17 is a chart (No. 2) showing an integrated value at the time of knocking and an integrated value by noise.

As shown in FIG. 16, when magnitude of vibration due to noise is large, the difference between the maximum value of the integrated values at the time of knocking and the maximum value of the integrated values due to noise is small and it may be difficult to distinguish between knocking and noise from knocking magnitude N. Therefore, as shown in FIG. 17, it is also possible to calculate knock magnitude N by using the sum of the integrated values in the vibration waveform (a value obtained by integrating all output voltages of knock sensor 300 in the knock detection gate) instead of the peak value P of the integrated values. In other words, it is also possible to calculate knock magnitude N by dividing the sum of the integrated values in the vibration waveform by BGL.

As shown in FIG. 17, because a period in which vibrations due to noise occur is shorter than a period in which vibrations due to knocking occur, a difference between the sum of integrated values of knocking and that of noise may be large. Therefore, by calculating knock magnitude N based on the sum of the integrated values, it is possible to obtain a large difference between knock magnitude N calculated at the time of knocking and knock magnitude N calculated as a result of noise. Thus, it is possible to clearly distinguish between vibration due to knocking and vibration due to noise.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for controlling ignition timing of an internal combustion engine, comprising:
a knock sensor that detects magnitude of vibration occurring in said internal combustion engine; and
an operation unit connected to said knock sensor;
wherein:
said operation unit calculates knock magnitude related to magnitude of vibration due to knocking, based on the magnitude of vibration occurring in said internal combustion engine;
said operation unit controls ignition timing of said internal combustion engine, based on a result of comparison between said knock magnitude and a predetermined determination value;
said operation unit corrects said determination value, based on an occurrence frequency of knocking; and
said operation unit sets said determination value, when a difference between the magnitude of vibration occurring in said internal combustion engine and said determination value is greater than a predetermined value, to a value determined in accordance with the magnitude of vibration occurring in said internal combustion engine.

2. The device for controlling ignition timing of the internal combustion engine according to claim 1, wherein
said operation unit sets said determination value, when a difference between a maximum value of the magnitudes of vibration occurring in said internal combustion engine and said determination value is greater than said predetermined value, to a value determined in accordance with the magnitude of vibration occurring in said internal combustion engine.

3. The device for controlling ignition timing of the internal combustion engine according to claim 2, wherein
said operation unit sets said determination value to a value obtained by adding said predetermined value to the maximum value of the magnitudes of vibration occurring in said internal combustion engine.

4. A device for controlling ignition timing of an internal combustion engine, comprising:
a knock sensor that detects magnitude of vibration occurring in said internal combustion engine; and
an operation unit connected to said knock sensor;
wherein:
said operation unit calculates knock magnitude related to magnitude of vibration due to knocking, based on the magnitude of vibration occurring in said internal combustion engines;
said operation unit controls ignition timing of said internal combustion engine, based on a result of comparison between said knock magnitude and a predetermined determination value;
said operation unit corrects said determination value, based on an occurrence frequency of knocking; and
when a difference between the magnitude of vibration occurring in said internal combustion engine and said determination value is greater than a predetermined value, said operation unit corrects said determination value by a greater amount than when the difference is smaller.

5. The device for controlling ignition timing of the internal combustion engine according to claim 4, wherein
when a difference between a maximum value of the magnitudes of vibration occurring in said internal combustion engine and said determination value is greater than said predetermined value, said operation unit corrects said determination value by a greater amount than when the difference is smaller.

6. The device for controlling ignition timing of the internal combustion engine according to claim 5, wherein
said operation unit corrects said determination value by an amount that increases as a difference between a maximum value of the magnitudes of vibration occurring in said internal combustion engine and said determination value increases.

7. A method of controlling ignition timing of an internal combustion engine, comprising:
detecting magnitude of vibration occurring in said internal combustion engine;
calculating knock magnitude related to magnitude of vibration due to knocking, based on the magnitude of vibration occurring in said internal combustion engine;

controlling ignition timing of said internal combustion engine, based on a result of comparison between said knock magnitude and a predetermined determination value;

correcting said determination value, based on an occurrence frequency of knocking; and setting said determination value, when a difference between the magnitude of vibration occurring in said internal combustion engine and said determination value is greater than a predetermined value, to a value determined in accordance with the magnitude of vibration occurring in said internal combustion engine.

8. The method of controlling ignition timing of the internal combustion engine according to claim 7, wherein setting said determination value comprises setting said determination value, when a difference between a maximum value of the magnitudes of vibration occurring in said internal combustion engine and said determination value is greater than said predetermined value, to a value determined in accordance with the magnitude of vibration occurring in said internal combustion engine.

9. The device for controlling ignition timing of the internal combustion engine according to claim 8, wherein setting said determination value comprises setting said determination value to a value obtained by adding said predetermined value to the maximum value of the magnitudes of vibration occurring in said internal combustion engine.

10. A method of controlling ignition timing of an internal combustion engine, comprising:

detecting magnitude of vibration occurring in said internal combustion engine;

calculating knock magnitude related to magnitude of vibration due to knocking, based on the magnitude of vibration occurring in said internal combustion engine;

controlling ignition timing of said internal combustion engine, based on a result of comparison between said knock magnitude and a predetermined determination value; and correcting said determination value, based on an occurrence frequency of knocking, wherein correcting said determination value comprises, when a difference between the magnitude of vibration occurring in said internal combustion engine and said determination value is greater than a predetermined value, correcting said determination value by a greater amount than when the difference is smaller.

11. The method of controlling ignition timing of the internal combustion engine according to claim 10, wherein correcting said determination value comprises, when a difference between a maximum value of the magnitudes of vibration occurring in said internal combustion engine and said determination value is greater than said predetermined value, correcting said determination value by a greater amount than when the difference is smaller.

12. The method of controlling ignition timing of the internal combustion engine according to claim 11, wherein correcting said determination value comprises correcting said determination value by an amount that increases as a difference between a maximum value of the magnitudes of vibration occurring in said internal combustion engine and said determination value increases.

13. A device for controlling ignition timing of an internal combustion engine, comprising:

means for detecting magnitude of vibration occurring in said internal combustion engine;

means for calculating knock magnitude related to magnitude of vibration due to knocking, based on the magnitude of vibration occurring in said internal combustion engine;

means for controlling ignition timing of said internal combustion engine, based on a result of comparison between said knock magnitude and a predetermined determination value;

means for correcting said determination value, based on an occurrence frequency of knocking; and setting means for setting said determination value, when a difference between the magnitude of vibration occurring in said internal combustion engine and said determination value is greater than a predetermined value, to a value determined in accordance with the magnitude of vibration occurring in said internal combustion engine.

14. The device for controlling ignition timing of the internal combustion engine according to claim 13, wherein said setting means includes means for setting said determination value, when a difference between a maximum value of the magnitudes of vibration occurring in said internal combustion engine and said determination value is greater than said predetermined value, to a value determined in accordance with the magnitude of vibration occurring in said internal combustion engine.

15. The device for controlling ignition timing of the internal combustion engine according to claim 14, wherein said setting means includes means for setting said determination value to a value obtained by adding said predetermined value to the maximum value of the magnitudes of vibration occurring in said internal combustion engine.

16. A device for controlling ignition timing of an internal combustion engine, comprising:

means for detecting magnitude of vibration occurring in said internal combustion engine;

means for calculating knock magnitude related to magnitude of vibration due to knocking, based on the magnitude of vibration occurring in said internal combustion engine;

means for controlling ignition timing of said internal combustion engine, based on a result of comparison between said knock magnitude and a predetermined determination value; and correcting means for correcting said determination value, based on an occurrence frequency of knocking, wherein said correcting means includes means for, when a difference between the magnitude of vibration occurring in said internal combustion engine and said determination value is greater than a predetermined value, correcting said determination value by a greater amount than when the difference is smaller.

17. The device for controlling ignition timing of the internal combustion engine according to claim 16, wherein said correcting means includes means for, when a difference between a maximum value of the magnitudes of vibration occurring in said internal combustion engine and said determination value is greater than said predetermined value, correcting said determination value by a greater amount than when the difference is smaller.

18. The device for controlling ignition timing of the internal combustion engine according to claim 17, wherein said correcting means includes means for correcting said determination value by an amount that increases as a difference between a maximum value of the magnitudes of vibration occurring in said internal combustion engine and said determination value increases.

* * * * *